(12) United States Patent
Fukuma et al.

(10) Patent No.: US 9,733,673 B2
(45) Date of Patent: Aug. 15, 2017

(54) DISPLAY MODULE

(71) Applicant: Japan Display Inc., Tokyo (JP)

(72) Inventors: Toshihiko Fukuma, Tokyo (JP); Norio Oku, Tokyo (JP)

(73) Assignee: Japan Display Inc., Tokyo (JP)

(*) Notice: Subject to any disclaimer, the term of this patent is extended or adjusted under 35 U.S.C. 154(b) by 16 days.

(21) Appl. No.: 15/006,728

(22) Filed: Jan. 26, 2016

(65) Prior Publication Data
US 2016/0216738 A1 Jul. 28, 2016

(30) Foreign Application Priority Data
Jan. 28, 2015 (JP) .................................. 2015-014781

(51) Int. Cl.
G06F 3/041 (2006.01)
G06F 1/16 (2006.01)

(52) U.S. Cl.
CPC .......... G06F 1/1652 (2013.01); G06F 1/1643 (2013.01); *G06F 2203/04102* (2013.01)

(58) Field of Classification Search
CPC .................. G06F 1/1652; G06F 1/1643; G06F 2203/04102
See application file for complete search history.

(56) References Cited

U.S. PATENT DOCUMENTS

| | | | |
|---|---|---|---|
| 2006/0209218 A1* | 9/2006 | Lee | G04G 9/00 349/1 |
| 2007/0152577 A1 | 7/2007 | Cho et al. | |
| 2009/0115743 A1* | 5/2009 | Oowaki | G06F 3/044 345/174 |
| 2013/0002133 A1 | 1/2013 | Jin et al. | |
| 2014/0247405 A1 | 9/2014 | Jin et al. | |
| 2014/0354558 A1* | 12/2014 | Cho | G06F 3/0412 345/173 |
| 2015/0062525 A1* | 3/2015 | Hirakata | G02F 1/133305 349/158 |
| 2016/0202782 A1* | 7/2016 | Park | G06F 3/044 345/173 |

FOREIGN PATENT DOCUMENTS

| | | |
|---|---|---|
| JP | 2007-183605 A | 7/2007 |
| JP | 2013-015835 A | 1/2013 |

\* cited by examiner

*Primary Examiner* — Adam R Giesy
(74) *Attorney, Agent, or Firm* — Typha IP LLC (57) ABSTRACT

A display module includes an image display panel, a touch screen, a first FPC substrate, and a second FPC substrate. The first and second FPC substrates are disposed so as not to overlap with each other. The image display panel has a first curved portion in its first peripheral area. The touch screen has a second curved portion in its second peripheral area. The first and second FPC substrates each extend toward the opposite side of the image display panel from the touch screen.

9 Claims, 6 Drawing Sheets

DISPLAY MODULE

CROSS-REFERENCE TO RELATED APPLICATION

The present application claims priority from Japanese application JP2015-014781 filed on Jan. 28, 2015, the content of which is hereby incorporated by reference into this application.

BACKGROUND OF THE INVENTION

1. Field of the Invention

The present invention relates to display modules.

2. Description of the Related Art

As disclosed in JP 2007-183605 A and JP 2013-015835 A, display modules into which a plurality of flexible substrates are integrated are conventionally known. Some of the display modules each include two superposed circuit substrates: one has an image display area provided with an image display function, and the other has an additional function added to the image display function. Examples of the circuit substrate with the additional function include a touch screen. A flexible wiring substrate is joined to an edge of each of the circuit substrates disposed on top of each other.

If one of the flexible wiring substrates, which are joined to the corresponding edges of the flexible wiring substrates disposed on top of each other, has a projection on its surface, the projection may interfere with the other flexible wiring substrate and cause an electrical connection failure between the flexible wiring substrates.

SUMMARY OF THE INVENTION

In view of the above problem, it is an object of the present invention to avoid mutual interference between first and second flexible wiring substrates.

A display module according to an aspect of the present invention has a first circuit substrate, a second circuit substrate, a first flexible wiring substrate, and a second flexible wiring substrate. The first and second circuit substrates are flexible. The first circuit substrate has a display area provided with an image display function and has a first peripheral area outside the display area. The second circuit substrate has an additional function area provided with a function added to the image display function and has a second peripheral area outside the additional function area. The second circuit substrate partially overlaps with the first circuit substrate. The first flexible wiring substrate is joined to a first edge of the first peripheral area so as to be electrically coupled to the first circuit substrate. The second flexible wiring substrate is joined to a second edge of the second peripheral area so as to be electrically coupled to the second circuit substrate. The first and second circuit substrates are disposed so that the display area and the additional function area are superposed and so that the first and second edges are offset from each other. The first and second flexible wiring substrates are disposed so as not to overlap with each other. The first circuit substrate has a first curved portion in the first peripheral area. The second circuit substrate has a second curved portion in the second peripheral area. The first and second flexible wiring substrates each extend toward the opposite side of the first circuit substrate from the second circuit substrate. In this display module, the first and second flexible wiring substrates do not overlap with each other. Thus, mutual interference between the first and second flexible wiring substrates is avoided.

DETAILED DESCRIPTION OF THE INVENTION

The following describes embodiments of the present invention with reference to the accompanying drawings.

Figure 1A:
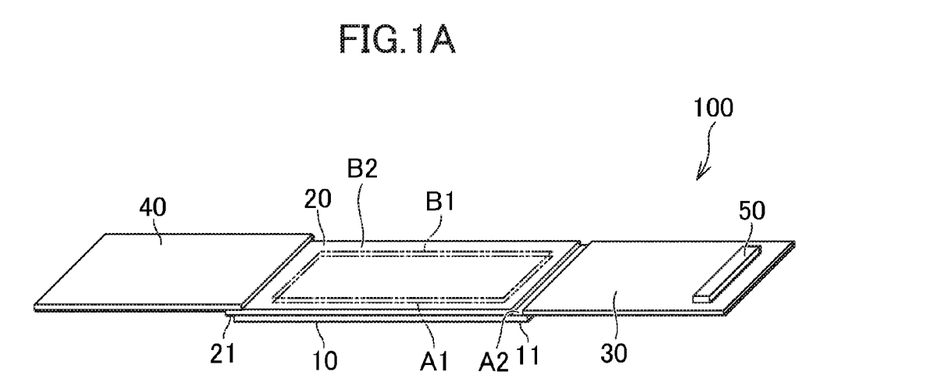
FIG. 1A is an external perspective view of a developed display module according to a first embodiment.
Figure 1B:
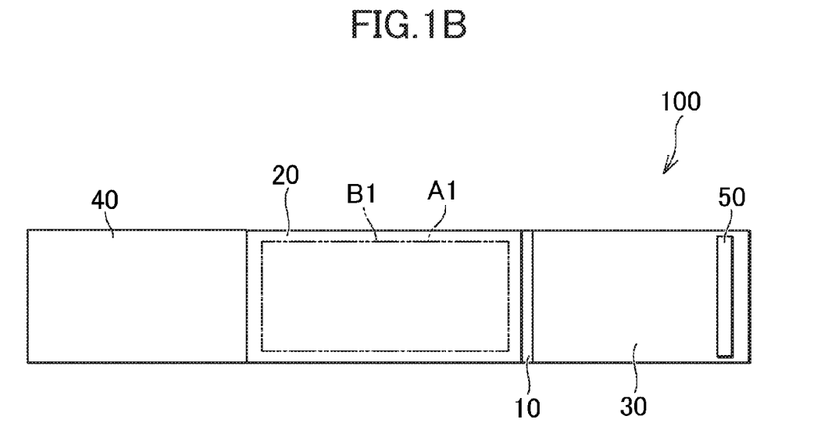
FIG. 1B is a plan view of the developed display module according to the first embodiment.
Figure 2:
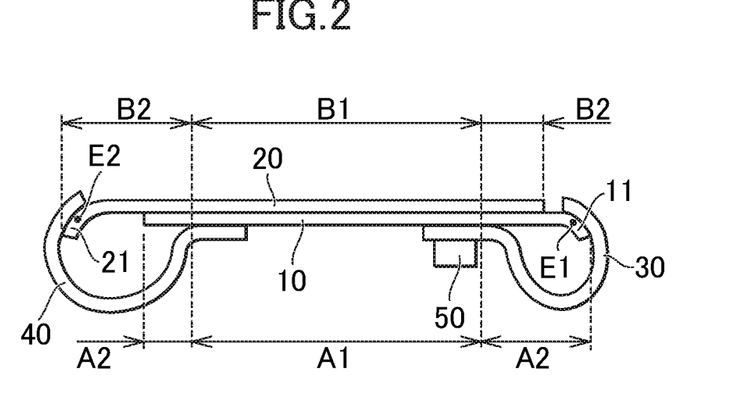
FIG. 2 is a side view of the display module according to the first embodiment.
Figure 3A:
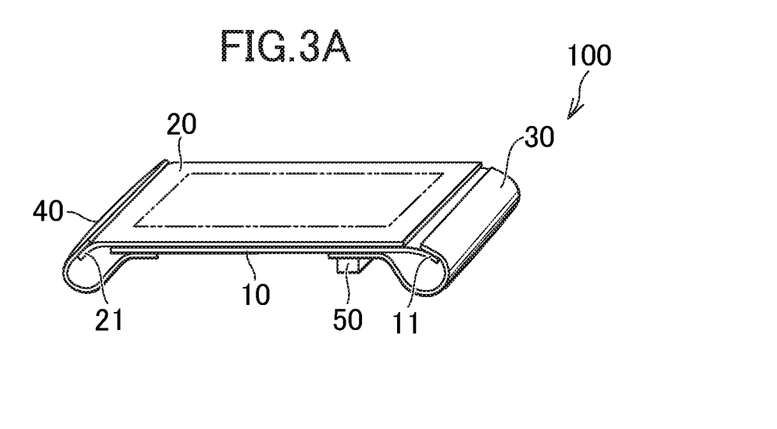
FIG. 3A is an external perspective view of the display module according to the first embodiment.
Figure 3B:
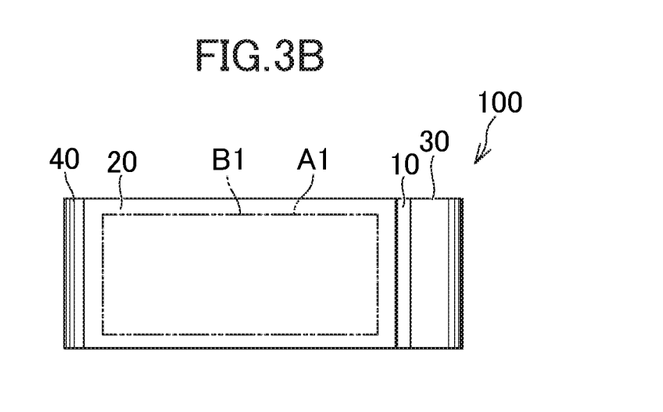
FIG. 3B is a plan view of the display module according to the first embodiment, when viewed from the front surface side of its display area.
Figure 3C:
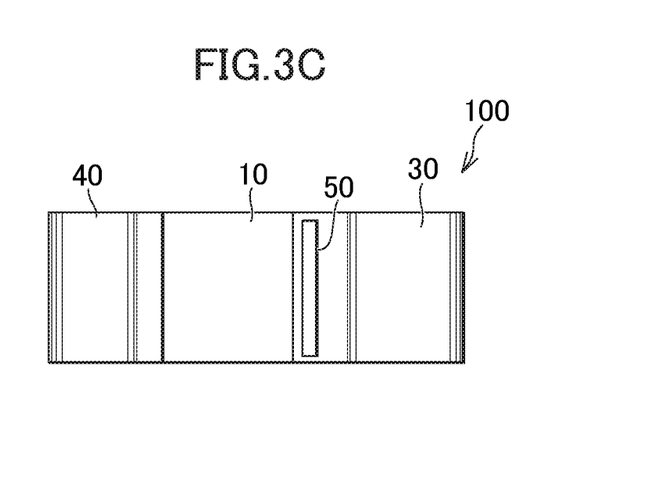
FIG. 3C is a plan view of the display module according to the first embodiment, when viewed from the back surface side of the display area.

FIG. 1A is an external perspective view of a developed display module according to a first embodiment. FIG. 1B is a plan view of the developed display module according to the first embodiment. FIG. 2 is a side view of the display module according to the first embodiment. FIG. 3A is an external perspective view of the display module according to the first embodiment. FIG. 3B is a plan view of the display module according to the first embodiment, when viewed from the front surface side of its display area. FIG. 3C is a plan view of the display module according to the first embodiment, when viewed from the back surface side of the display area. An image display panel 10 has a display area. The front surface of the display area is the surface facing a touch screen 20 and the back surface of the display area is the opposite side of the image display panel 10 from the touch screen 20.

A display module 100 has the image display panel 10 as a first circuit substrate and the touch screen 20 as a second circuit substrate. The image display panel 10 is flexible. The image display panel 10 has a display area A1 (the area inside a two-dot chain line in FIGS. 1A and 1B) provided with an image display function, and a first peripheral area A2 (the area outside the two-dot chain line in FIGS. 1A and 1B) that is outside of the display area A1. As shown in FIG. 2, the display area A1 is superposed on an additional function area B1 of the touch screen 20 described below.

Although not shown in detail, the image display panel 10 is a flexible organic electroluminescent (EL) display device and includes a thin film transistor (TFT) substrate and a counter substrate (e.g., a sealing substrate or a color filter substrate). The TFT substrate includes a TFT circuit layer, an organic EL layer, a sealing layer, and other layers. The TFT circuit layer controls light emission of the organic EL layer. The sealing layer is made of an inorganic insulating material that covers the organic EL layer. Examples of the image display panel 10 include display devices for mobile terminals.

The touch screen 20 is flexible. The touch screen 20 has the additional function area B1 (the area inside a two-dot chain line in FIGS. 1A and 1B) provided with a function added to the image display function of the image display panel 10, and a second peripheral area B2 (the area outside the two-dot chain line in FIGS. 1A and 1B) that is outside of the additional function area B1. The touch screen 20 is disposed to partially overlap with the image display panel 10.

In the display module 100 according to the first embodiment, a touch screen provided with an input function is employed as the second circuit substrate. The input function enables users to operate a device by pressing an object displayed on its screen. However, the present invention is not limited to this configuration. The second circuit substrate may be any other circuit substrate that has a function added to the image display function and to which a flexible printed circuit (FPC) is electrically coupled. For example, the second circuit substrate may be a circuit substrate having an additional function that can produce 3D images, such as a parallax barrier. The touch screen 20 itself may double as a counter substrate of the image display panel 10.

As shown in FIG. 1 and other figures, the display module 100 according to the first embodiment has a FPC substrate 30 as a first flexible wiring substrate and a FPC substrate 40 as a second flexible wiring substrate. The FPC substrates 30 and 40 are each a substrate that is made of a base material formed by laminating an insulating resin material and a conductive metal and that has an electric circuit.

The FPC substrate 30 is joined to a first edge 11 in the first peripheral area A2 of the image display panel 10 so as to be electrically coupled to the image display panel 10. The FPC substrate 40 is joined to a second edge 21 in the second peripheral area B2 of the touch screen 20 so as to be electrically coupled to the touch screen 20.

The FPC substrates 30 and 40 are disposed so as not to overlap with each other. Specifically, in the first embodiment, the difference between the direction from the display area A1 to the first edge 11 and the direction from the additional function area B1 to the second edge 21 is 180 degrees. Accordingly, the FPC substrate 30 joined to the first edge 11 and the FPC substrate 40 joined to the second edge 21 are disposed to have a difference in direction of 180 degrees.

An integrated circuit (IC) 50 as an electronic component is mounted on the FPC substrate 30. As shown in FIGS. 1A to 3C, in the first embodiment, the IC 50 is mounted near an edge of the FPC substrate 30 which is opposite to the edge joined to the first edge 11 of the image display panel 10. The IC 50, which is mounted on the front surface of the FPC substrate 30, protrudes from the front surface of the FPC substrate 30 by the thickness of the IC 50. Also as shown in FIGS. 1A and 3C, the IC 50 in the first embodiment is formed in a substantially rectangular prism to extend in the direction (transverse direction) perpendicular to the longitudinal direction of the FPC substrate 30 having a substantially rectangular shape.

To modularize components, such as the image display panel 10, the touch screen 20, the FPC substrate 30, and the FPC substrate 40, an edge of the image display panel 10 and an edge of the touch screen 20 are each curved, and the FPC substrates 30 and 40 are each bent so as to extend toward the opposite side of the image display panel 10 from the touch screen 20. The components thus modularized, including four substrates, are included in, for example, a housing. Specifically, as shown in FIG. 2, the flexible image display panel 10 has a first curved portion E1 in the first peripheral area A2. In the first embodiment, the first curved portion E1 is formed at the first edge 11. Guided by the curve of the image display panel 10, the FPC substrate 30, which is joined to the image display panel 10, is curved in the direction of curvature of the first curved portion E1 and then extended along the back surface side of the image display panel 10.

Also as shown in FIG. 2, the touch screen 20 has a second curved portion E2 in the second peripheral area B2. In the first embodiment, the second curved portion E2 is formed at the second edge 21. The FPC substrate 40, which is joined to the touch screen 20, is curved in the direction of curvature of the second curved portion E2 and then extended along the back surface side of the image display panel 10.

Use of such a configuration, that is, curving the image display panel 10, the touch screen 20, the FPC substrate 30, and the FPC substrate 40 reduces the first peripheral area A2, which is on the same plane as the display area A1, and thus narrows the frame of the display module 100.

In addition, as described above, the FPC substrates 30 and 40 are disposed to have a difference in direction of 180 degrees, so that they are spaced apart from each other while remaining bent on the opposite side of the image display panel 10 from the touch screen 20.

In the display module 100 according to the first embodiment, use of the above configuration prevents the IC 50 mounted on the FPC substrate 30 from interfering with the FPC substrate 40. Consequently, an electrical connection failure between the FPC substrates 30 and 40 is prevented. In addition, interference of the IC 50 is prevented from causing damage to the FPC substrate 40. Consequently, an electrical connection failure caused by damage to the FPC substrate 40 is prevented.

Figure 4A:
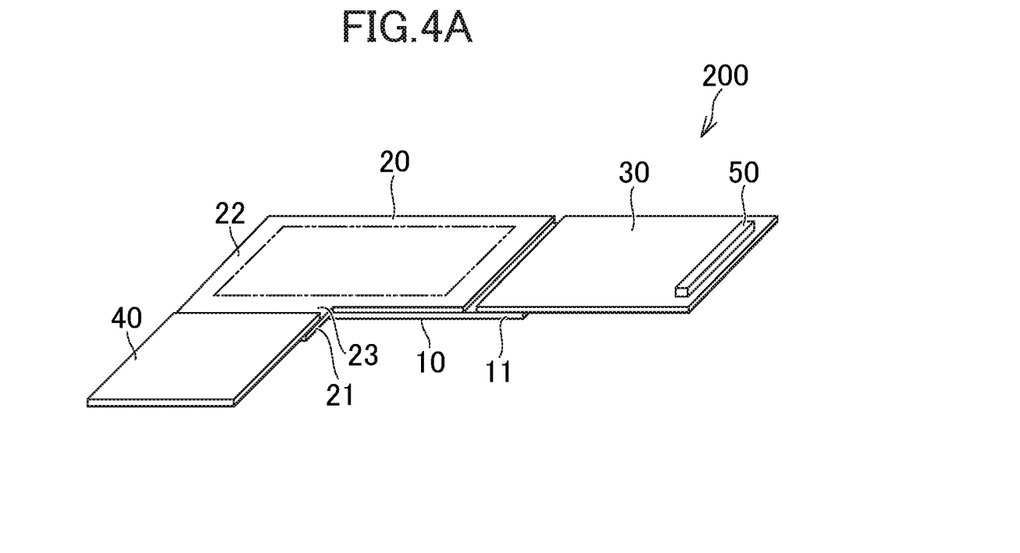
FIG. 4A is an external perspective view of a developed display module according to a second embodiment.
Figure 4B:
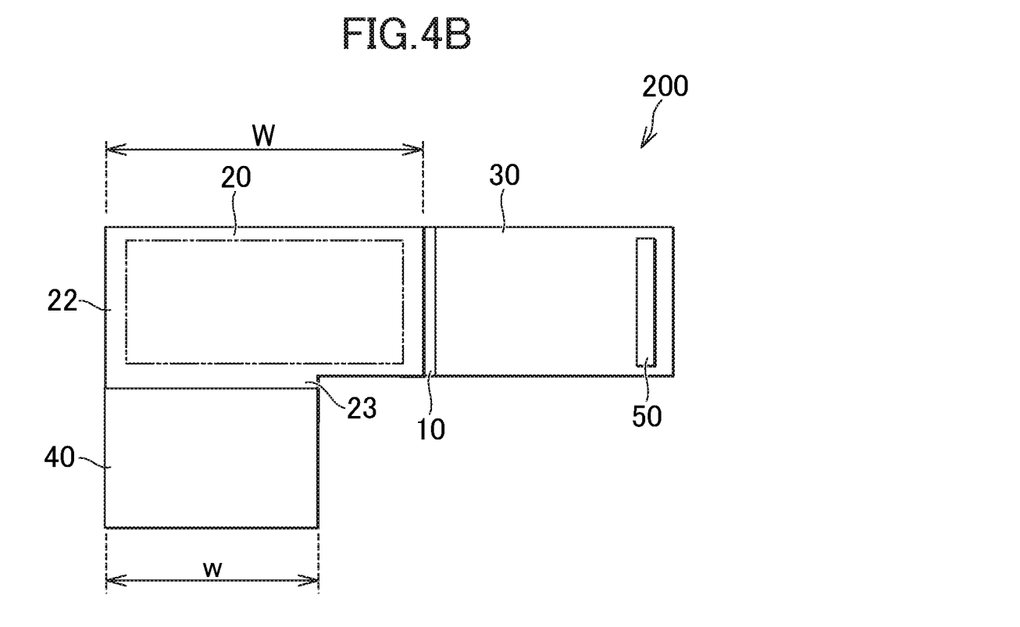
FIG. 4B is a plan view of the developed display module according to the second embodiment.
Figure 5A:
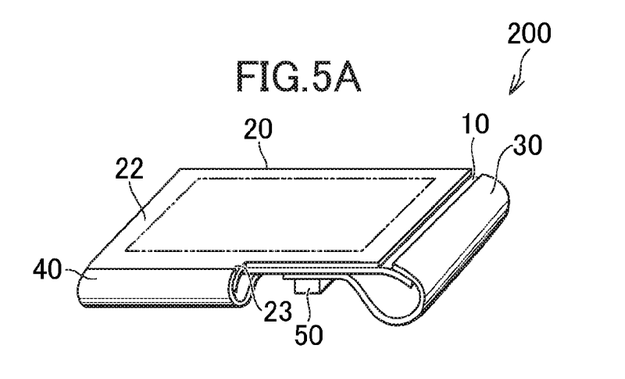
FIG. 5A is an external perspective view of the display module according to the second embodiment.
Figure 5B:
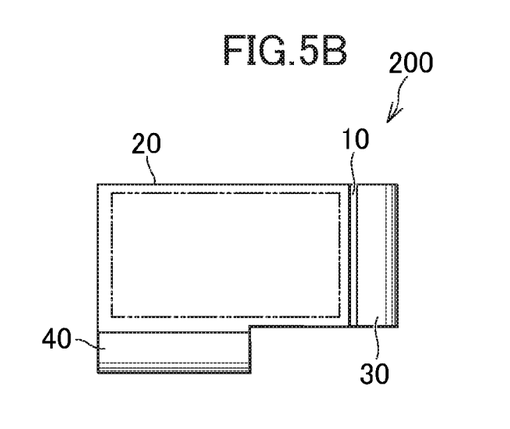
FIG. 5B is a plan view of a display module according to the second embodiment, when viewed from the front surface side of its display area.
Figure 5C:
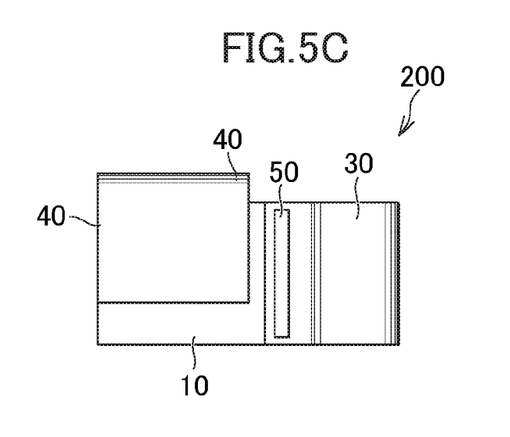
FIG. 5C is a plan view of the display module according to the second embodiment, when viewed from the back surface side of the display area.

The following describes a display module according to a second embodiment with reference to FIGS. 4A, 4B, and 5A to 5C. FIG. 4A is an external perspective view of a developed display module according to the second embodiment. FIG. 4B is a plan view of the developed display module according to the second embodiment. FIG. 5A is an external perspective view of the display module according to the second embodiment. FIG. 5B is a plan view of a display module according to the second embodiment, when viewed from the front surface side of its display area. FIG. 5C is a plan view of the display module according to the second embodiment, when viewed from the back surface side of the display area.

A display module 200 according to the second embodiment has the image display panel 10 as the first circuit substrate, the touch screen 20 as the second circuit substrate, the FPC substrate 30 as the first flexible wiring substrate, and the FPC substrate 40 as the second flexible wiring substrate, as with the display module 100 according to the first embodiment. In the first embodiment, the difference between the direction from the display area A1 to the first edge 11 and the direction from the additional function area B1 to the second edge 21 is 180 degrees. The second embodiment differs from the first embodiment in that the difference in direction is 90 degrees. That is, the FPC substrates 30 and 40 are disposed to have a difference in direction of 90 degrees so as not to overlap with each other.

As shown in FIG. 4A, the touch screen 20 has an overlapping portion 22 that overlaps with the image display panel 10 and an extending portion 23 that extends from the overlapping portion 22. The leading edge of this extending portion 23 is the second edge 21 to which the FPC substrate 40 is joined. As shown in FIG. 4B, in the direction perpendicular to the direction of extension of the extending portion 23, the width w of the extending portion 23 is less than the width W of the overlapping portion 22.

The extending portion 23 with the second edge 21 is curved. The FPC substrate 40 is curved in the direction of curvature of the extending portion 23 and then extended along the back surface side of the image display panel 10.

In the display module 200 according to the second embodiment, use of such a configuration prevents the IC 50 mounted on the FPC substrate 30 from interfering with the FPC substrate 40, as in the first embodiment. Consequently, an electrical connection failure between the FPC substrates 30 and 40 is prevented. In addition, interference of the IC 50 is prevented from causing damage to the FPC substrate 40. Consequently, an electrical connection failure caused by damage to the FPC substrate 40 is prevented.

Although FIGS. 4A, 4B, an 5A to 5C show a configuration in which the touch screen 20 has an extending portion, the present invention is not limited to this configuration. The image display panel 10 may have an extending portion having the first edge 11 at its leading edge, and the difference between the direction of extension of the extending portion and the direction from the additional function area B1 to the second edge 21 may be 90 degrees. Even such a configuration, in which the FPC substrates 30 and 40 are disposed to have a difference in direction of 90 degrees, prevents the IC 50 mounted on one of the FPC substrates from interfering with the other FPC substrate.

Figure 6:
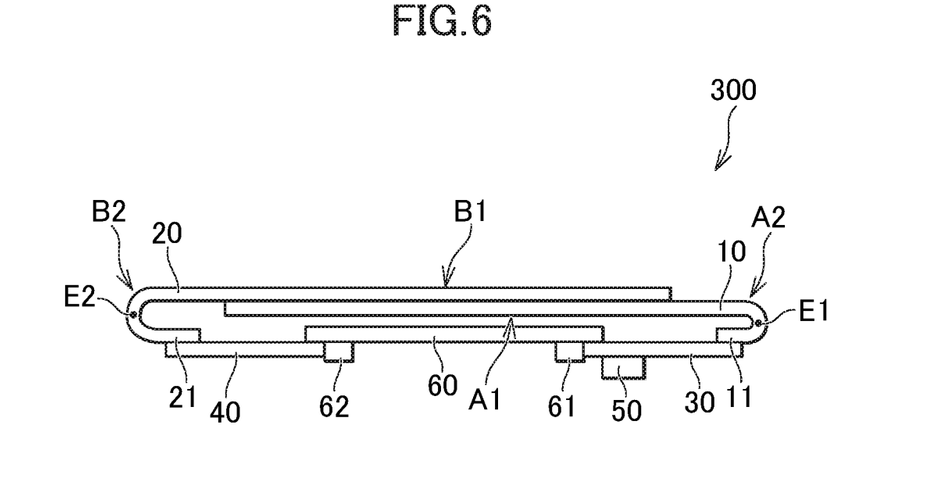
FIG. 6 is a side view of a display module according to a third embodiment.

The following describes a display module according to a third embodiment with reference to FIG. 6. FIG. 6 is a side view of the display module according to the third embodiment. In the above description of FIGS. 1A to 5C, the image display panel 10 has the first curved portion E1 at the first edge 11 and the touch screen 20 has the second curved portion E2 at the second edge 21, whereas in the following description of FIG. 6, the image display panel 10 has the first curved portion E1 between the display area A1 and the first edge 11 and the touch screen 20 has the second curved portion E2 between the additional function area B1 and the second edge 21. The same components as in first and second embodiments, which are described with reference to FIGS. 1A to 5C, are denoted by the same reference signs, and thus are not described in detail herein.

In a display module 300 according to the third embodiment, the difference between the direction from the display area A1 to the first edge 11 and the direction from the additional function area B1 to the second edge 21 is 180 degrees, as with the display module 100 according to the first embodiment. That is, the FPC substrate 30 joined to the first edge 11 and the FPC substrate 40 joined to the second edge 21 are disposed to have a difference in direction of 180 degrees and do not overlap with each other. In the display module 300, the image display panel 10 is curved at a position closer to the display area A1 in the first peripheral area A2 than that of the display module 100 according to the first embodiment. The touch screen 20 is also curved at a position closer to the additional function area B1 in the second peripheral area B2. Use of such a configuration reduces the first peripheral area A2, which is on the same plane as the display area A1, and thus further narrows the frame of the display module.

The display module 300 has an external circuit substrate 60 disposed on the opposite side of the image display panel 10 from the touch screen 20. The external circuit substrate 60 is electrically coupled to the FPC substrate 30 via a connector 61 and to the FPC substrate 40 via a connector 62.

The image display panel 10, the touch screen 20, the FPC substrate 30, and the FPC substrate 40 are curved by elastic deformation. The external circuit substrate 60 respectively connects the FPC substrates 30 and 40 via the connectors 61 and 62 so as to resist a restoring force produced by the elastic deformation. Thus, each substrate remains curved. Consequently, the shape of each substrate is kept and its deformation is prevented.

In the above embodiments, an example configuration in which the IC 50 as an electronic component is mounted on the FPC substrate 30 have been described. However, the present invention is not limited to this configuration. Whether or not there are any electronic components, by disposing the FPC substrates 30 and 40 so that they do not overlap with each other, the FPC substrates 30 and 40 are spaced apart and thus mutual interference between the FPC substrates is avoided, that is, an advantageous effect of the present invention is achieved.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display module comprising:
a first circuit substrate being flexible, having a display area provided with an image display function, and having a first peripheral area outside the display area;
a second circuit substrate, being flexible, having an additional function area provided with a function added to the image display function, and having a second peripheral area outside the additional function area, the second circuit substrate partially overlapping with the first circuit substrate;
a first flexible wiring substrate joined to a first edge of the first peripheral area so as to be electrically coupled to the first circuit substrate; and
a second flexible wiring substrate joined to a second edge of the second peripheral area so as to be electrically coupled to the second circuit substrate, wherein
the first and second circuit substrates are disposed so that the display area and the additional function area are superposed and so that the first and second edges are offset from each other,
the first and second flexible wiring substrates are disposed so as not to overlap with each other,
the first circuit substrate has a first curved portion in the first peripheral area,
the first flexible wiring substrate extends toward an opposite side of the first circuit substrate from the second circuit substrate,
the second circuit substrate has a second curved portion in the second peripheral area, and
the second flexible wiring substrate extends toward an opposite side of the first circuit substrate from the second circuit substrate.

2. The display module according to claim 1, wherein
the first flexible wiring substrate is curved in a direction of curvature of the first curved portion, and
the second flexible wiring substrate is curved in a direction of curvature of the second curved portion.

3. The display module according to claim 1, wherein
the first curved portion is formed at least at the first edge, and
the second curved portion is formed at least at the second edge.

4. The display module according to claim 1, wherein
a difference between a direction from the display area to the first edge and a direction from the additional function area to the second edge is 180 degrees.

5. The display module according to claim 1, wherein
a difference between a direction from the display area to the first edge and a direction from the additional function area to the second edge is 90 degrees.

6. The display module according to claim 5, wherein
one of the first and second circuit substrates has an overlapping portion overlapping with the other and an extending portion extending from the overlapping portion,
at least a leading edge of the extending portion is the first edge or the second edge, and
in a direction perpendicular to a direction of extension of the extending portion, a width of the extending portion is less than a width of the overlapping portion.

7. The display module according to claim 1, further comprising
an external circuit substrate disposed on an opposite side of the first circuit substrate from the second circuit substrate,
wherein the external circuit substrate is electrically coupled to the first flexible wiring substrate and the second flexible wiring substrate.

8. The display module according to claim 7, wherein
the first and second flexible wiring substrates are curved by elastic deformation, and
the external circuit substrate connects the first and second flexible wiring substrates so as to resist a restoring force produced by the elastic deformation.

9. The display module according to claim 7, wherein
the first and second circuit substrates are curved by elastic deformation, and
the external circuit substrate connects the first and second flexible wiring substrates so as to resist a restoring force produced by the elastic deformation of the first and second circuit substrates.

* * * * *